United States Patent [19]

Young

[11] 4,157,020

[45] Jun. 5, 1979

[54] METHOD OF AND DEVICES FOR LUBRICATING ROTATING TORQUE TRANSMITTING COUPLINGS

[75] Inventor: Otto V. Young, Toledo, Ohio

[73] Assignee: Libbey-Owens-Ford Company, Toledo, Ohio

[21] Appl. No.: 812,759

[22] Filed: Jul. 5, 1977

[51] Int. Cl.² .............................................. F16D 3/18
[52] U.S. Cl. .................... 64/9 R; 64/30 LB; 64/17 A; 184/14
[58] Field of Search .............. 184/12, 7, 14; 64/17 A, 64/17 R, 9 R, 14, 30 LB; 403/36–40

[56] References Cited

U.S. PATENT DOCUMENTS

| | | | |
|---|---|---|---|
| 1,429,980 | 9/1922 | Spangler | 64/9 R |
| 1,770,743 | 7/1930 | Morgan | 64/9 R |
| 2,330,552 | 11/1942 | Brooks | 64/9 R X |
| 3,410,111 | 11/1968 | Ireland | 64/14 X |
| 3,651,662 | 3/1972 | Hoffman | 64/9 R |
| 3,874,194 | 4/1975 | Filepp et al. | 64/14 X |
| 3,991,855 | 11/1976 | Heintzelman | 64/17 X |

Primary Examiner—David H. Brown
Attorney, Agent, or Firm—Collins, Oberlin & Darr

[57] ABSTRACT

A method of and device for lubricating a torque transmitting coupling while it is rotating, the coupling being of the type having two halves that are drivingly connected by an intermediate member. The coupling is provided with a ring having a lubricant passage which is confluent with lubricant passages in the coupling. The ring is capable of rotating with the coupling or being held stationary relative thereto so that when the coupling is rotating the ring can be held stationary, and lubricant can be introduced into its passage and flow into the lubricant passages of the coupling.

1 Claim, 4 Drawing Figures

METHOD OF AND DEVICES FOR LUBRICATING ROTATING TORQUE TRANSMITTING COUPLINGS

BACKGROUND OF THE INVENTION

1. Field of the Invention

This invention generally relates to torque transmitting couplings and more particularly to methods and devices for lubricating the couplings while they are in operation.

2. Description of the Prior Art

In the production of glass, it is customary to produce a continuous ribbon of glass from a highly heated molten mass and pass this plastic ribbon through an annealing lehr which operates continuously in conjunction with a melting furnace producing the molten mass of glass. It is well known that in passing the continuous glass ribbon through the lehr, it is conveyed on conveyor rolls that are driven in common by a continuously operating drive train. The drive train includes torque transmitting couplings connecting the various roll driving members together for common rotation. Generally, conventionally constructed couplings include a pair of opposed coupling halves interconnected by an intermediate member. Such couplings require proper lubrication at all times and, since the lehr must be operated continuously in producing the glass ribbon, lubrication of the couplings employed in the drive train is a problem; particularly the lubrication of the couplings rotating in space which connect the roll driving members of the train together. In accordance with the present invention, the couplings rotating in space now can be lubricated while they are in operation.

SUMMARY OF THE INVENTION

Generally stated, the present invention contemplates providing a torque transmitting coupling with a lubricating ring which is capable of rotating with the coupling or being held stationary while the coupling rotates relative thereto. More particularly, the lubricating ring is frictionally mounted on a member of a coupling and its inner face is provided with an annular groove which is confluent with the lubricant passages of the coupling for the flow of lubricant therebetween. A pair of O-ring seals disposed in the inner face of the ring, besides sealing the area between the ring and the coupling member, also serves to frictionally hold the lubricating ring to the coupling for rotation therewith. This construction permits the ring to be held stationary while the coupling rotates. Accordingly, the lubricating ring is provided with at least one member which can be grasped by an operator to stop rotation of the ring so that lubricant can be introduced into its groove passage through a suitable fitting and thus into the lubricant passages of the coupling.

OBJECTS AND ADVANTAGES

An object of this invention is to provide a torque transmitting coupling which can be lubricated while it is rotating in space.

Another object of this invention is to provide a torque transmitting coupling with a lubricating device which normally rotates with the coupling but which can be held stationary while the coupling rotates relative thereto.

Still another object of this invention is to provide a torque transmitting coupling with a lubricating device that is inexpensive, easy to manufacture and efficient in operation.

Other objects and advantages will become more apparent during the course of the following description when taken in connnection with the accompanying drawings.

BRIEF DESCRIPTION OF THE DRAWINGS

In the drawings wherein like numerals are employed to designate like parts throughout the same.

DESCRIPTION OF THE PREFERRED EMBODIMENTS

Figure 1:
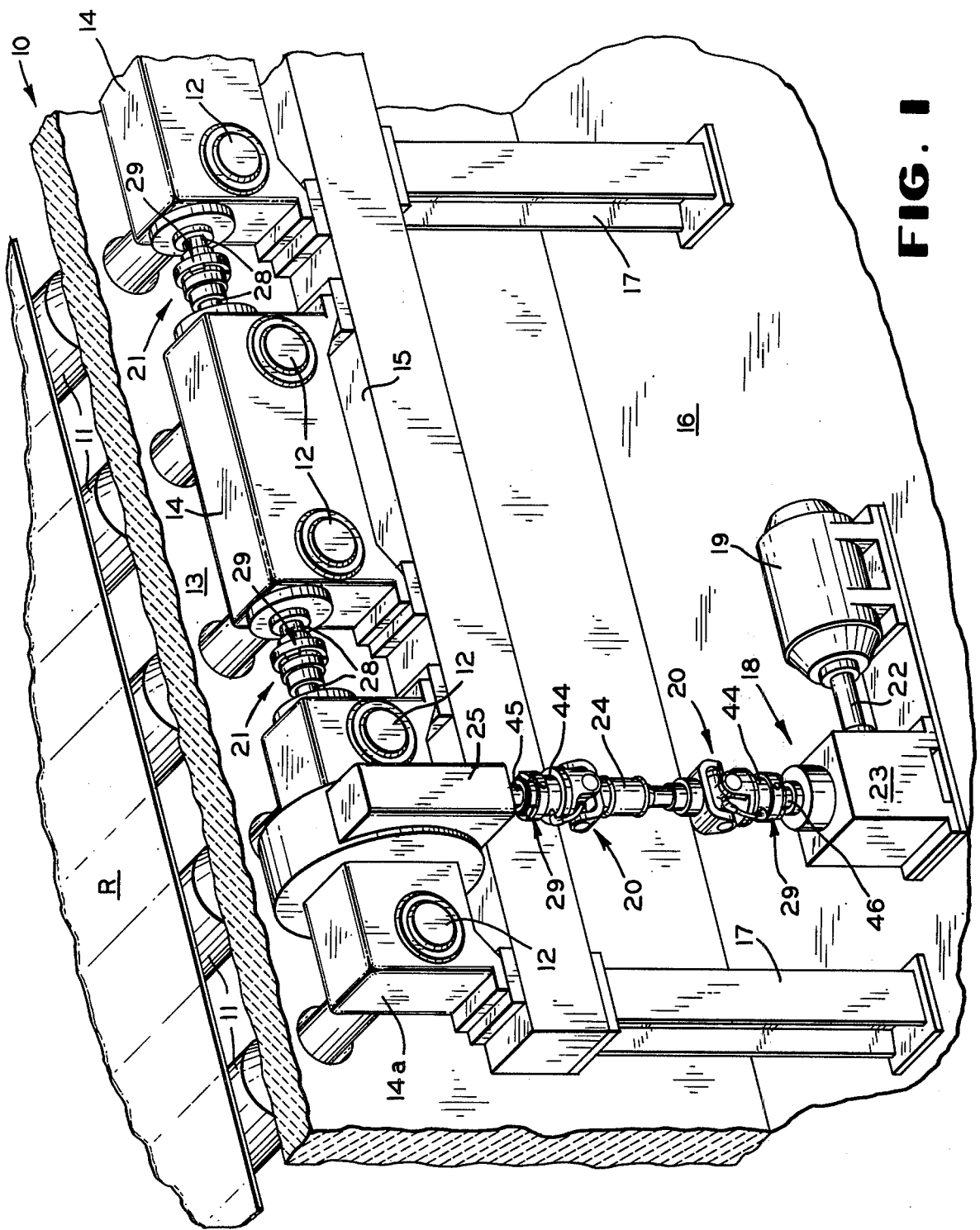
FIG. 1 is a fragmentary perspective view of a lehr conveying roll drive train employing torque transmitting couplings incorporating the present invention.

In FIG. 1 there is illustrated a portion of an annealing lehr 10 conventionally used in the manufacture of a continuous ribbon of glass R. The lehr 10 includes a conveyor system comprising a plurality of longitudinally spaced conveying rolls 11 extending transversely of the lehr 10, which at one of their ends 12 project through a side wall 13 forming part of the lehr 10. The ends 12 of the rolls 11 are received in gear boxes 14 mounted on a longitudinally extending rail 15 supported in spaced relation above the floor 16 on upstanding legs 17. The conveying rolls 11 are driven in common by a drive train designated in its entirety by the numeral 18, to continuously move the ribbon of glass R through the lehr 10.

As illustrated in FIG. 1, the drive train 18, in addition to the gear boxes 14, includes a motor 19 for driving the gear boxes and two types of torque transmitting couplings incorporating the present invention, one type coupling being a universal joint 20 and the other being a gear type coupling 21. More particularly, the motor 19 is drivingly connected by a shaft 22, to a right angle drive unit 23 mounted on the floor 16. The drive unit 23 is then drivingly connnected to one of the gear boxes 14a by a drive shaft 24, through a right angle drive mechanism 25, the drive shaft 24 being provided with a universal joint coupling 20 at each of its ends. The drive train 18 is completed by connecting the driven gear box 14a to the adjacent gear box 14 through opposed ends 26 and 27 (See FIG. 4) of a shaft 28 extending from each end wall of the gear boxes 14. The opposed ends 26 and 27 of each shaft 28 are joined together by a gear coupling 21. As shown, the couplings 20 and 21 rotate in space, and conventionally constructed couplings which heretofore could only be lubricated when they were stationary, can now be lubricated while they are rotating in space.

In accordance with the present invention, each torque transmitting coupling 20 and 21 is provided with a lubricating ring designated in its entirety by the reference 29, which permits its respective coupling to be lubricated while it is rotating. More particularly, each lubricating ring 29 is mounted on its respective coupling member in such a manner that it can rotate therewith or be held stationary while the coupling rotates relative thereto. This feature of the invention is obtained by frictionally mounting the lubricating ring 29 on a desired member of the coupling.

Figure 2:
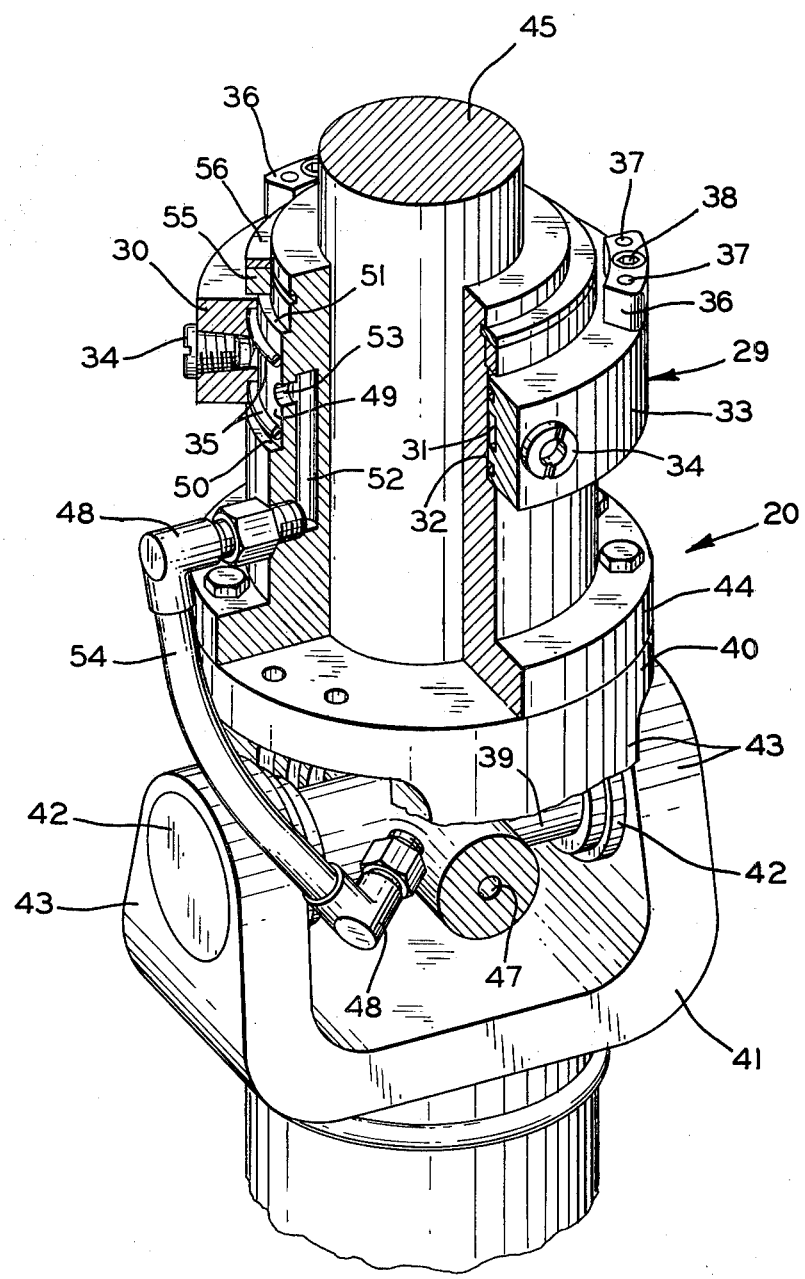
FIG. 2 is an enlarged perspective view, partly in section, and having some parts broken away for clarity, of one of the universal joint couplings illustrated in FIG. 1.
Figure 3:
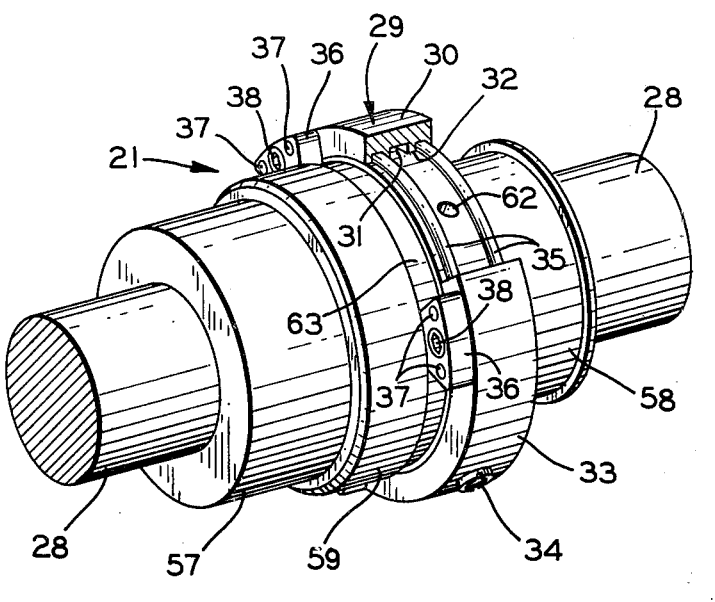
FIG. 3 is an enlarged perspective view, with parts cut away, of one of the gear couplings illustrated in FIG. 1.
Figure 4:
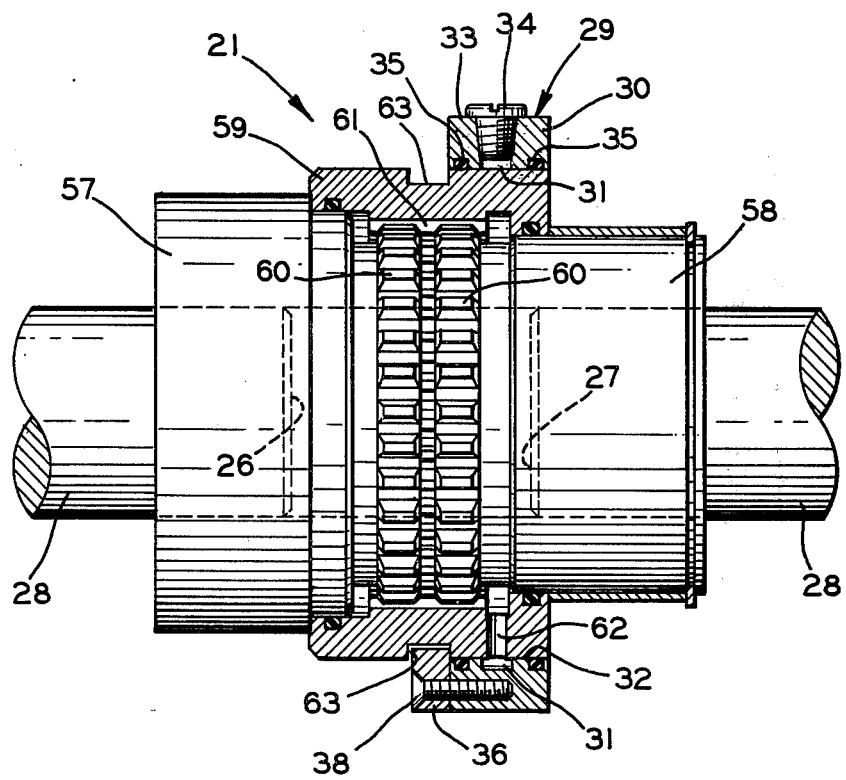
FIG. 4 is an enlarged axial view, partly in section, of the gear coupling shown in FIG. 3.

Referring particularly to FIGS. 2, 3 and 4, each lubricating ring 29 includes a ring member 30 having a groove 31 extending around the surface of its inner face 32. The outer peripheral surface 33 of the ring is provided with at least one lubricating fitting 34 which is confluent with the groove 31. A pair of O-rings 35, one disposed on each side of the groove 31 in the inner face 32, frictionally holds and seals the ring member 30 to the desired coupling member. At least one grasping device such as a peg 36 is fixedly mounted on one of the side faces of the ring member 30. More specifically, the peg 36 is positioned on and secured to the ring member 30 by a pair of roll pins 37 and a cap screw 38. Thus, an operator can grasp the peg 36 to hold the lubricating ring 29 in a stationary position. The mounting of the lubricating ring 29 on the couplings 20 and 21 will be included with the description of each respective coupling.

In the embodiment of the invention shown in FIG. 2, each universal joint coupling 20 includes a journal cross 39 and a pair of opposed yokes 40 and 41 connected thereto. The journal cross 39 is provided with the usual trunion and bearing assemblies 42 arranged at 90° intervals in a common plane at the periphery of the body portion of the cross. Each yoke 40 and 41 is provided with a pair of axially spaced arms 43 having bores disposed centrally therein and adapted to receive the trunion and bearing assemblies 42 on the cross member 39.

Each universal joint 20 also includes a companion flange 44 attached to one of the yoke members; namely, yoke 40 as shown in FIG. 2 for attachment to a shaft 45 extending from the right-angle drive unit 25 mounted on the gear box 14a and a shaft 46 extending from the right-angle drive unit 23 mounted on the floor 16.

The above described universal joint 20 requires proper lubrication at all times and conventionally the connections within the trunion and bearing assemblies 42 have been lubricated through a lubricant fitting (not shown) secured to the body of the cross member 39 which is confluent with a passage 47 in each of the trunions. In this construction, the universal joint 20 can only be lubricated while it is at rest. However, in this embodiment of the invention, the lubricant fitting is replaced by a tubular member 48 which connects the lubricant passages of the universal joint 20 to the passage of the aforedescribed lubricating ring 29.

In accordance with this invention, a conventional companion flange is modified to receive the lubricating ring 29 and provide a passage for the flow of lubricant from the ring 29 to the fitting 48 on the journal cross 39. More particularly, the outer peripheral surface of the companion flange 44 is provided with a cylindrical bearing surface 49 for rotatably receiving the inner face 32 of the lubricating ring 29. The bearing surface 49, defined by a raised shoulder 50 at one of its ends and a depressed shoulder 51 at its other end is slightly wider than the ring 29 so that the ring can rotate thereon. The flange 44 is provided with an axially extending lubricant passage 52 and has an end 53 opening into the bearing surface 49 while its other end which is axially displaced therefrom, is adapted to also receive a tubular fitting 48. The tubular fittings 48 are connected together by a flexible hose 54 for passing lubricant from the passage 52 of the companion flange 44 to the passages 47 of the journal cross 39.

Still referring to FIG. 2, the aforedescribed lubricating ring 29 is mounted on the bearing surface 49 of the companion flange 44 with its groove 31 confluent with the open end 53 of the passage 52. In this construction, the O-rings 35 in the inner face 32 frictionally and sealingly contact the bearing surface 49 of the flange 44, and thus the ring 29 will rotate with the coupling 20. A collar 55 for holding the lubricating ring 29 on the bearing surface 49 is provided on the flange 44; the collar 55, being held in abutting relation against the depressed shoulder 51 by a retainer ring 56. Accordingly, the lubricating ring 29 is contained on the bearing surface 49 between the shoulder 50 and the collar 55 with its annular groove 31 confluent with the open end 53 of the passage 52 at all times.

In the embodiment of the coupling shown in FIGS. 3 and 4, each gear coupling 21 includes a pair of opposed coupling halves 57 and 58 and a cylindrical housing 59 which surrounds and interconnects the coupling halves for rotation as a unit. Each coupling half 57 and 58 is provided with the usual gear teeth 60 which mesh with gear teeth 61 provided in the central portion of the bore of the housing 59.

This coupling construction also requires proper lubrication at all times, and conventionally, the connection between the meshing gear teeth 60 and 61 has been lubricated through a lubricant fitting (not shown) secured to the housing 59 which is confluent with a passage 62 opening into the interior of the housing 59. Also in this construction, the conventional gear coupling can only be lubricated while it is at rest. However, in this embodiment of the invention, the lubricant fitting is replaced directly by the lubricating ring 29.

In accordance with the invention and as illustrated in FIGS. 3 and 4, the lubricating ring 29 is mounted in a surrounding relationship on the cylindrical housing 59 of the coupling 21 with its groove 31 confluent with passage 62 opening into the interior of the housing 59. In this instance, the ring 29 is held in its surrounding assembled relationship on the coupling housing 59 by the peg 36 which extend into an annular groove 63 provided in the outer peripheral surface of the housing 59. As in the previously described embodiment, the O-rings 35 frictionally and sealingly engage the surface of the housing 59 to normally rotate with the coupling.

Thus, to introduce lubricant into the couplings 20 and 21 while they are rotating, an operator grasps a peg 36 with a hook tool (not shown) to stop rotation of the lubricating ring 29 at which time a lubricating gun can be connected to the fitting 34. Accordingly, lubricant can be ejected from the gun into the passage 31 of the lubricating ring 29. In the case of the universal joint coupling, lubricant flows from the lubricating ring 29, through passage 52 in the companion flange 44, through the flexible hose 54 and into the conventional lubricant passages 47 in the journal cross 39. In the case of the gear coupling 21, lubricant flows from the passage 31 in the lubricating ring 29 directly into the conventional lubricant passage 62 provided in the housing 59.

It is to be understood that the forms of the invention herewith shown and described are to be taken as illustrative embodiments only of the same and that various changes in the shape, size and arrangement of the parts may be resorted to without departing from the spirit of the invention.

I claim:

1. In a torque transmitting coupling for use in a continuously operating drive train, the combination comprising:
   a. a pair of opposed coupling members;
   b. an intermediate coupling member drivingly interconnecting said opposed coupling members and having lubricating passages therein;
   c. a lubricating ring comprising a unitary one-piece body having a centrally disposed groove in the surface of its inner face and frictionally mounted on said intermediate coupling member for rotation therewith, but which is capable of being held stationary relative thereto so that rotation of said ring can be periodically interrupted for introducing lubricant into the groove of said ring, said groove being confluent with the lubricating passages in said intermediate coupling member;
   d. a pair of spaced-apart O-rings mounted in the inner face of said lubricating ring, one on each side of said lubricating groove therein and contacting said intermediate coupling member for sealingly and frictionally engaging said lubricating ring to said intermediate member;
   e. means attached to and projecting from said lubricating ring for movement therewith, said means comprising at least one peg extending from a side of said lubricating ring and being adapted to be grasped by an operator for holding said lubricating ring stationary while said coupling is rotating; and
   f. means for retaining said lubricating ring on said intermediate member, said retaining means comprising a portion of said peg which projects into an annular groove provided in the outer surface of said intermediate coupling member for retaining said lubricating ring thereon.

* * * * *